United States Patent [19]

Runnels et al.

[11] 4,378,920

[45] Apr. 5, 1983

[54] COMBUSTIBLY INERT AIR SUPPLY SYSTEM AND METHOD

[75] Inventors: Joe N. Runnels, Bellevue; Kenneth R. Fagerlund, Federal Way, both of Wash.

[73] Assignee: The Boeing Company, Seattle, Wash.

[21] Appl. No.: 169,140

[22] Filed: Jul. 15, 1980

[51] Int. Cl.³ .................................................. B64D 37/32
[52] U.S. Cl. .................................. 244/135 R; 169/45; 220/88 B; 137/209; 137/568
[58] Field of Search ..................... 244/135 A, 129.2; 137/8, 113, 209, 206, 207, 599, 599.1, 568, 569; 222/399, 61; 60/39.12; 55/21, 66, 158, 57, 58, 385 R, 518, 431, 468, 267; 220/88 B, 88 R; 169/45

[56] References Cited

U.S. PATENT DOCUMENTS

| | | | |
|---|---|---|---|
| 1,482,366 | 2/1924 | Anderson | 137/568 |
| 2,365,624 | 12/1944 | Cantello et al. | 158/36 |
| 2,545,532 | 3/1951 | Stevens | 137/113 |
| 2,756,215 | 7/1956 | Burgess et al. | 252/372 |
| 2,944,987 | 7/1960 | Potter et al. | 252/372 |
| 2,952,428 | 9/1960 | Bridgeman | 244/135 |
| 2,983,405 | 5/1961 | Tayler | 220/88 |
| 2,986,593 | 5/1961 | Detrick et al. | 137/209 |
| 3,103,296 | 9/1963 | Gour | 220/88 |
| 3,389,829 | 6/1968 | Stanford | 220/88 |
| 3,389,972 | 6/1968 | Pottharst, Jr. | 23/281 |
| 3,464,801 | 9/1969 | Barstow | 23/288 |
| 3,467,349 | 9/1969 | Gautier | 244/135 |
| 3,628,758 | 12/1971 | Nichols | 244/135 |
| 3,691,730 | 9/1972 | Hickey et al. | 55/166 |
| 3,693,915 | 9/1972 | Ulanovsky | 244/135 |
| 3,746,027 | 7/1973 | Elliott | 137/569 |
| 3,788,039 | 1/1974 | Bragg | 55/160 |
| 3,847,298 | 11/1974 | Hamilton | 220/88 |
| 3,898,998 | 8/1975 | Billberg | 220/88 B |
| 3,948,626 | 4/1976 | Bragg | 55/160 |
| 4,088,193 | 5/1978 | Colgate | 220/88 B |

FOREIGN PATENT DOCUMENTS 467334 6/1937 United Kingdom ............. 220/88 B

OTHER PUBLICATIONS

World Business, Apr. 12, 1980, p. 52.

*Primary Examiner*—Galen L. Barefoot
*Attorney, Agent, or Firm*—Ronald E. Suter; Bernard A. Donahue

[57] ABSTRACT

Compressed air is directed through an inert gas generator which removes oxygen to produce a nitrogen enriched, combustibly inert air or gas. The converter is sized to only meet the relatively low flow rate requirements of the system during which times the combustibly inert air or gas is delivered directly to a utilization site. The system further includes a high pressure storage container in which a pressurized precharge of the combustibly inert air or gas is stored. Combustibly inert air is released from such high pressure storage container for providing the higher flow rate requirements of the system. The system may be used aboard an aircraft for inerting fuel tanks. It may include a separate compressor for filling the high pressure storage container.

12 Claims, 11 Drawing Figures

PRIOR ART NITROGEN ENRICHED
AIR (NEA) GENERATION SYSTEM

COMBUSTIBLY INERT AIR SUPPLY SYSTEM AND METHOD

BACKGROUND OF THE INVENTION

1. Field of the Invention

The present invention relates to a method and apparatus for providing a combustibly inert air or gas, for use to inert fuel tanks and/or to suppress fire, or for any other use of a combustibly inert air or gas.

2. Description of the Prior Art

Advancements in enemy weapon technology against aircraft for the past several years has significantly increased the vulnerability of all types of aircraft conducting combat missions. Mission analysis studies conducted on air to surface (ATS) type combat aircraft indicate 90% of a strike force could be lost in each combat mission, without advanced survivability features, which could equate to billions of dollars loss in aircraft for a limited war period. Advanced aircraft survivability features being studied include: (1) Reduced radar cross section, (2) Electronic counter measures (ECM), and (3) Fuel tank protection.

The fuel tanks represent the largest vulnerable areas on all fixed wing aircraft and fuel tank inerting, which provides a non explosive atmosphere, significantly reduces the aircraft vulnerable area with an associated increase in survivability and a reduction in life cycle cost relative to an aircraft without inerting.

Aircraft fuel tanks are vulnerable to both natural and weapons threats. Natural threats include lightning strike, static discharges during refueling, and onboard ignition sources including engine fragments. Weapons threats include air-to-air, ground-to-air, and air-to-ground weapon fragments, etc.

One way of suppressing fire and explosions is to provide an inert environment within the fuel tank. A method of achieving this is to fill the tank ullage space with an inert gas, such as nitrogen, so as to maintain the oxygen concentration at or below nine percent by volume.

Full time gaseous inerting of fuel tanks is presently being accomplished with onboard stored liquid nitrogen. However, the use of liquid nitrogen is not always desirable because of weight, logistic, safety, and cost factors. Cost and weight penalties associated with the use of liquid nitrogen are especially high for large aircraft.

Major emphasis is being placed on developing onboard nitrogen generating systems to eliminate the logistics problem associated with providing liquid nitrogen. Hollow fiber permeable membrane and physical sorption inert gas generators (IGG) have emerged as prime candidates for onboard nitrogen generation. Unfortunately, the weight associated with these concepts is highly dependent on ullage volume and aircraft descent rate. Studies indicate that design inertant flow rates result from aircraft descent operation. Descent flow rates results from ullage volume repressurization required to preclude exceeding fuel tank pressure limitations when descending from high altitude to low altitude.

The most promising technology concepts for onboard generation of inert gas (IGG) from engine bleed air are the hollow fiber and molecular sieve designs under development by AiResearch Corporation of California and the Bendix Corporation respectively. Each of these concepts results in unacceptable weight and volume if the IGG units are sized to provide insert gas (9% oxygen concentration) flow rates required for larger aircraft during descent such as a strategic penetrator.

An onboard nitrogen concept would weight approximately 1800 lbs if sized to meet the requirements of the strategic penetrator. This weight penalty, and the associated concept, are considered unacceptable for aircraft having large fuel volume.

The novel system of our invention utilizes a high pressure stored gas subsystem for providing inert gas descent flow rates and a small IGG component to satisfy all fuel scrub and climb and cruise inertant requirements.

Prior art inert gas systems existing in the patent literature are disclosed by the following U.S. Pat. Nos. 2,365,624, granted Dec. 19, 1944, to Gaetano Cantello and Dominic Cantello; 2,944,987 granted July 12, 1960, to Donald A. Potter and Kurk Staiger; 2,952,428, granted Sept. 13, 1960, to Oscar C. Bridgeman; 2,983,405, granted May 9, 1961, to Colin A. M. Tayler; 3,389,829, granted June 25, 1968 to Alfred E. Stanford; 3,389,972, granted June 25, 1968, to John E. Pottharst, Jr.; 3,464,801, granted Sept. 2, 1969, to William F. Barston; 3,467,349, granted Sept. 16, 1969, to Robert A. Gautier; 3,628,758, granted Dec. 21, 1971 to Richard A. Nichols; 3,691,730, granted Sept. 19, 1972, to William G. Hickey and Richard L. Kenyon; 3,693,915, granted Sept. 26, 1972, to Jack M. Ulanovsky; 2,756,215, granted July 24, 1956 to Glenn A. Burgess, George E. Hlavka, and Leighton S. King; 3,788,039, granted Jan. 29, 1974, to Kenneth R. Bragg; 3,847,298, granted Nov. 12, 1974, to Mackenzie L. Hamilton; and 3,948,626, granted Apr. 6, 1976, to Kenneth R. Bragg. These patents and the article entitled "Bang Go the Big Ones", appearing in the Apr. 12, 1980, issue of *The Economist,* pages 52 and 53, should be carefully considered for the purpose of putting the present invention into proper perspective with respect to the prior art.

SUMMARY OF THE INVENTION

Basically, the combustibly inert gas supply system of the present invention comprises an inert gas generator means for converting compressed air into nitrogen enriched combustibly inert air or gas, and a high pressure storage means for storing a pressurized precharge of the combustibly inert air. The gas generator means is sized for directly providing only the relatively low flow rate requirements of the system and the recharging rates of the high pressure storage system. The high pressure storage means provides the higher flow rate requirements of the system. For example, in a fuel tank inerting system for an aircraft, the gas generator means is sized to directly meet the low flow rate requirements of the system which occur during ground operation, climb and cruise operation of the aircraft. During descent of the aircraft, stored combustibly inert air or gas is delivered from the high pressure storage means.

Our invention involves both methods and apparatus, the particulars of which are set forth in the description of the preferred embodiments.

BRIEF DESCRIPTION OF THE DRAWINGS

Referring to the drawings, wherein like reference characters designate like parts throughout the several views.

DETAILED DESCRIPTION OF THE PREFERRED EMBODIMENTS

Figure 1:
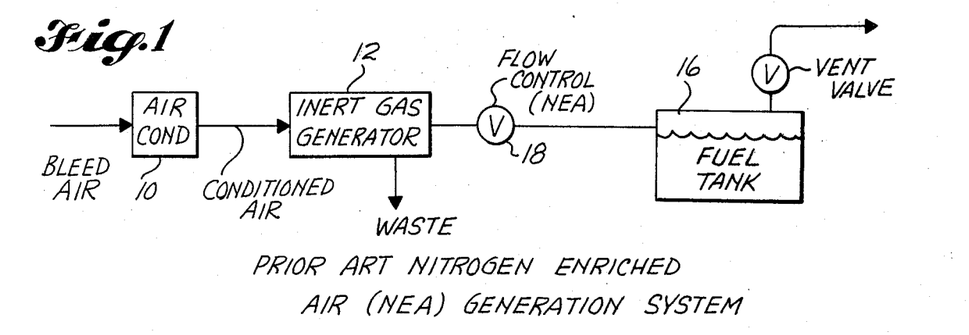
FIG. 1 is a schematic view of a prior art system for generating nigrogen enriched air from compressed air, e.g. bleed air from the compressor of a gas turbine engine aboard an aircraft.

FIG. 1 shows a prior art approach of generating nitrogen enriched air aboard an aircraft for inerting a gas tank. Bleed air from a compressor is delivered to air conditioning equipment 10 which serves to clean the air and reduce its temperature substantially. The inert gas generator 12 removes oxygen from the air, creating nitrogen enriched air which is substantially combustibly inert. Inertant inflow to the fuel tank 16 is controlled by a demand control valve 18 which receives its input from an electronic controller (not shown).

Figure 2:
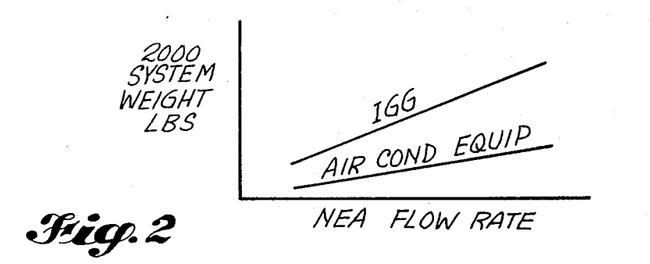
FIG. 2 is a graph relating to the system shown by FIG. 1, showing that for large nitrogen enriched air (NEA) flow rates the weight of the inert gas generator (IGG) and support air conditioning equipment becomes excessive.

As graphically shown by FIG. 2, the problem with a system of the type shown by FIG. 1, in which the inert gas generator and the supporting air conditioning equipment are sized to directly provide combustibly inert air under all conditions of operation, is that the weight of the equipment is excessive. FIG. 2 shows that the weight of the equipment is essentially directly proportional to the flow rate through the inert gas generator.

Figure 3:
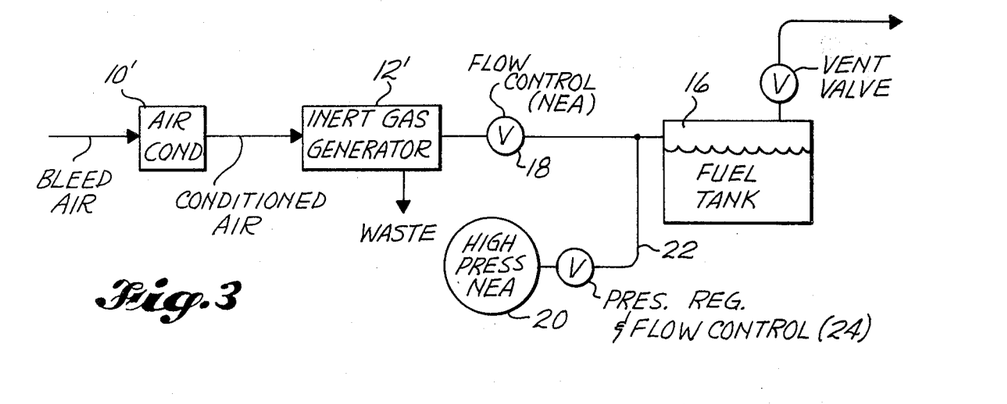
FIG. 3 is a schematic view of a first system constructed in accordance with the present invention, in which the weight problem is reduced by using stored high pressure nitrogen enriched air to deliver high rates of flow beyond the normal output of the inert gas generator.
Figure 4:
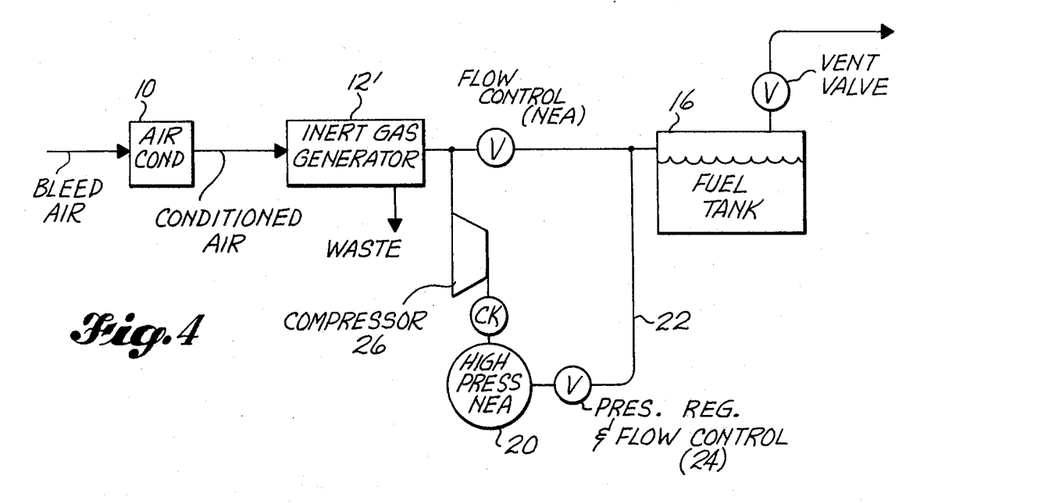
FIG. 4 is a schematic view of a second system constructed in accordance with the present invention in which a high pressure compressor is provided for onboard filling of the storage tank.

Referring to FIG. 3, the weight problem can be reduced by designing the inert gas generator 12' and its air conditioning and other support equipment to deliver nitrogen enriched air at only the relatively low flow rates encountered during ground operation, climb and cruise operation of the aircraft. High rates of flow which exceed the normal output of the inert gas generator are provided by means of stored high pressure nitrogen enriched air. The system is designed to include one or more high pressure storage tanks 20 (20' FIG. 10) having an outlet conduit 22 which leads to the fuel tank 16 and which includes a separate pressure regulator and flow control valve 24. A system of this type, used aboard an aircraft for example, could be precharged on the ground. Onboard filling of the high pressure tank 20 can be achieved by providing the system with a separate high pressure compressor 26, as shown by FIG. 4 of the drawings. This would prevent logistics problems associated with prefueling the high pressure container 20.

Figure 5:
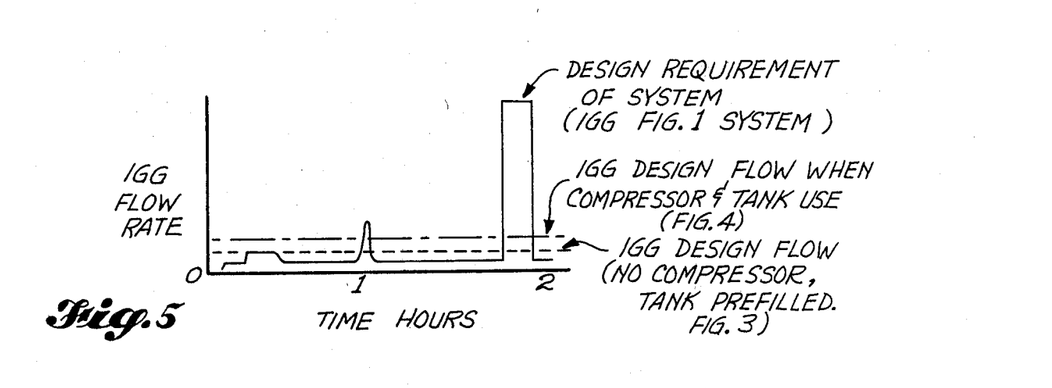
FIG. 5 is a graph of inert gas generator flow rate versus time, comparing the three systems shown schematically by FIGS. 1, 3, and 4.

As graphically shown by FIG. 5, the design flow rate of the inert gas generator is dependent upon the fuel tank inert gas flow rate requirements and on whether or not a storage container and compressor are used. This graph shows that the flow rate, and hence the size and weight, of the inert gas generator can be reduced a very substantial amount when the storage container is employed for providing the high flow rate demand of the system.

Figure 6:
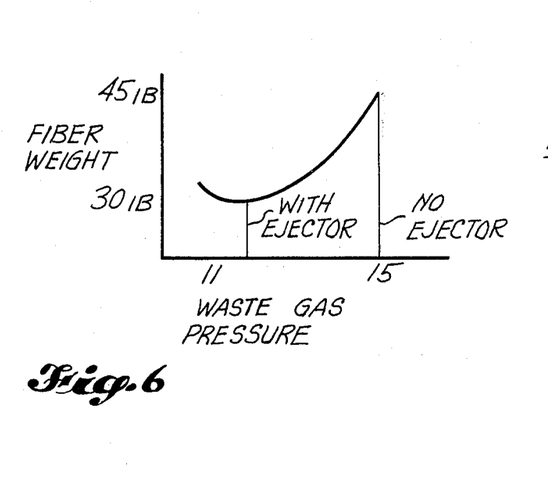
FIG. 6 is a graph of fiber weight versus waste gas pressure, showing that the inert gas generator size can be further reduced by using an ejector in the waste line to improve performance.
Figure 7:
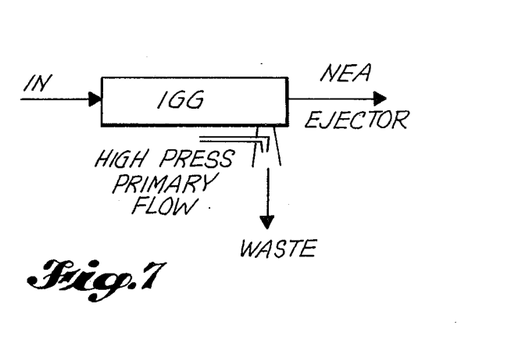
FIG. 7 is a schematic view of an inert gas generator which includes an ejector in its waste line which is operated by high pressure bleed air.

In accordance with an aspect of the present invention, an ejector can be provided in the waste conduit of the inert gas generator to reduce the pressure on the outlet side of the fibers which function to remove oxygen from the air (FIG. 7). This use of an ejector improves the performance of the inert gas generator, making it possible to further reduce the size of the inert gas generator (FIG. 6).

Figure 8:
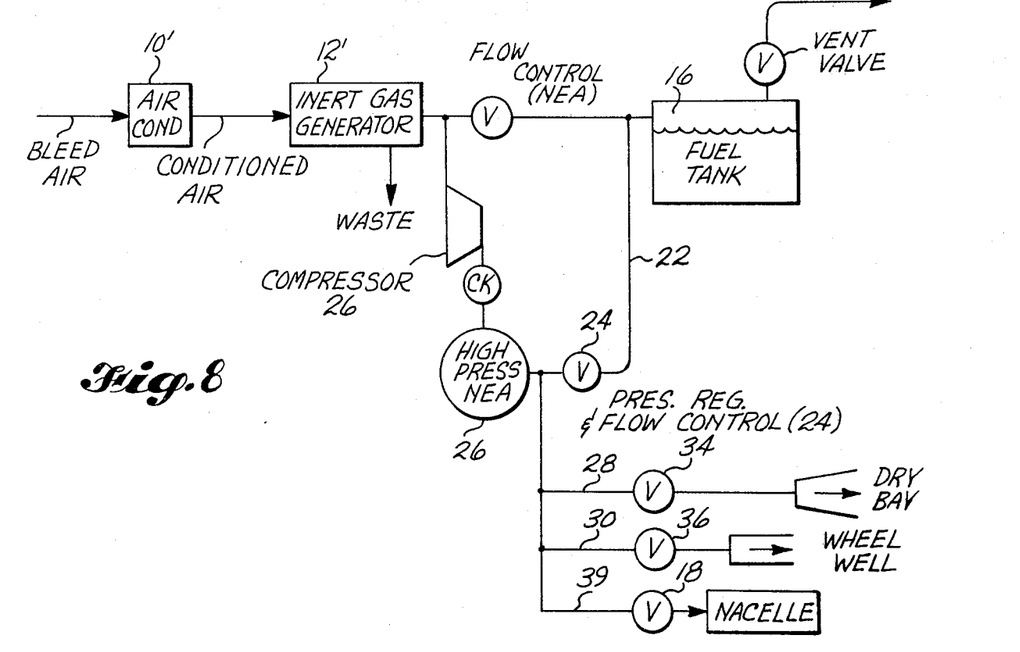
FIG. 8 is a schematic diagram of a system like FIG. 4, illustrating the optional use of the stored high pressure nitrogen enriched air as a fire suppressant.

FIG. 8 schematically shows how a fuel tank inerting system for an aircraft can be easily modified for permitting its optional use as a fire suppressant system. Additional branch conduit 28, 30, 32 are provided in the conduit leading from the high pressure storage container 20. Nitrogen enriched air from container 20 may be diverted to other portions of the aircraft by closing the valve 24 in conduit 22 and opening the valve 34, 36, or 38 in the branch conduit 28, 30, 32, which leads to the particular portion of the aircraft to which it is desired to deliver nitrogen enriched air.

Figure 9:
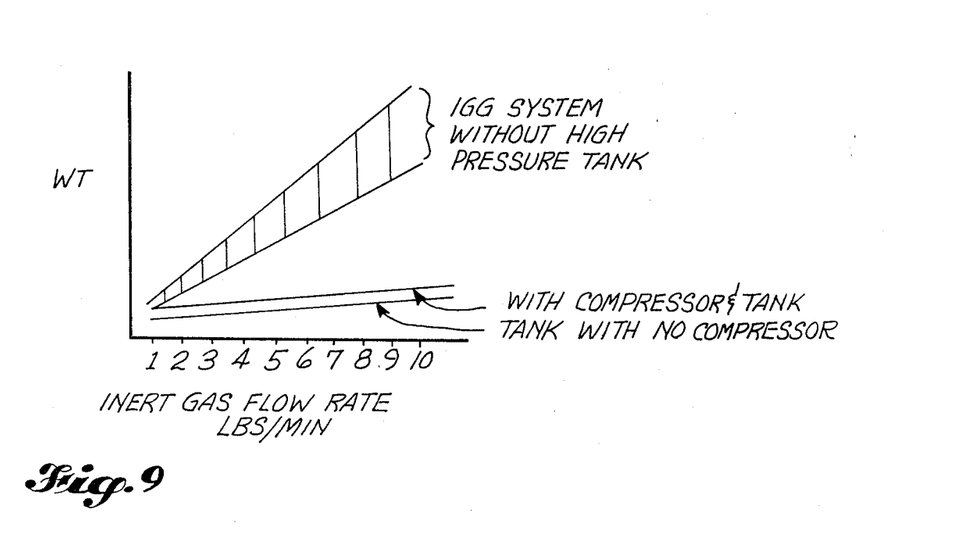
FIG. 9 is another graph of system weight versus nitrogen enriched air flow rate, graphically showing the potential for saving weight by using the various features of the present invention.

FIG. 9 graphically shows the weight saving potential of the system of the present invention. The flow rates are based on the system needs of a large aircraft.

A preferred embodiment will now be described, with reference being made to FIGS. 10 and 11 of the drawings.

Figure 10:
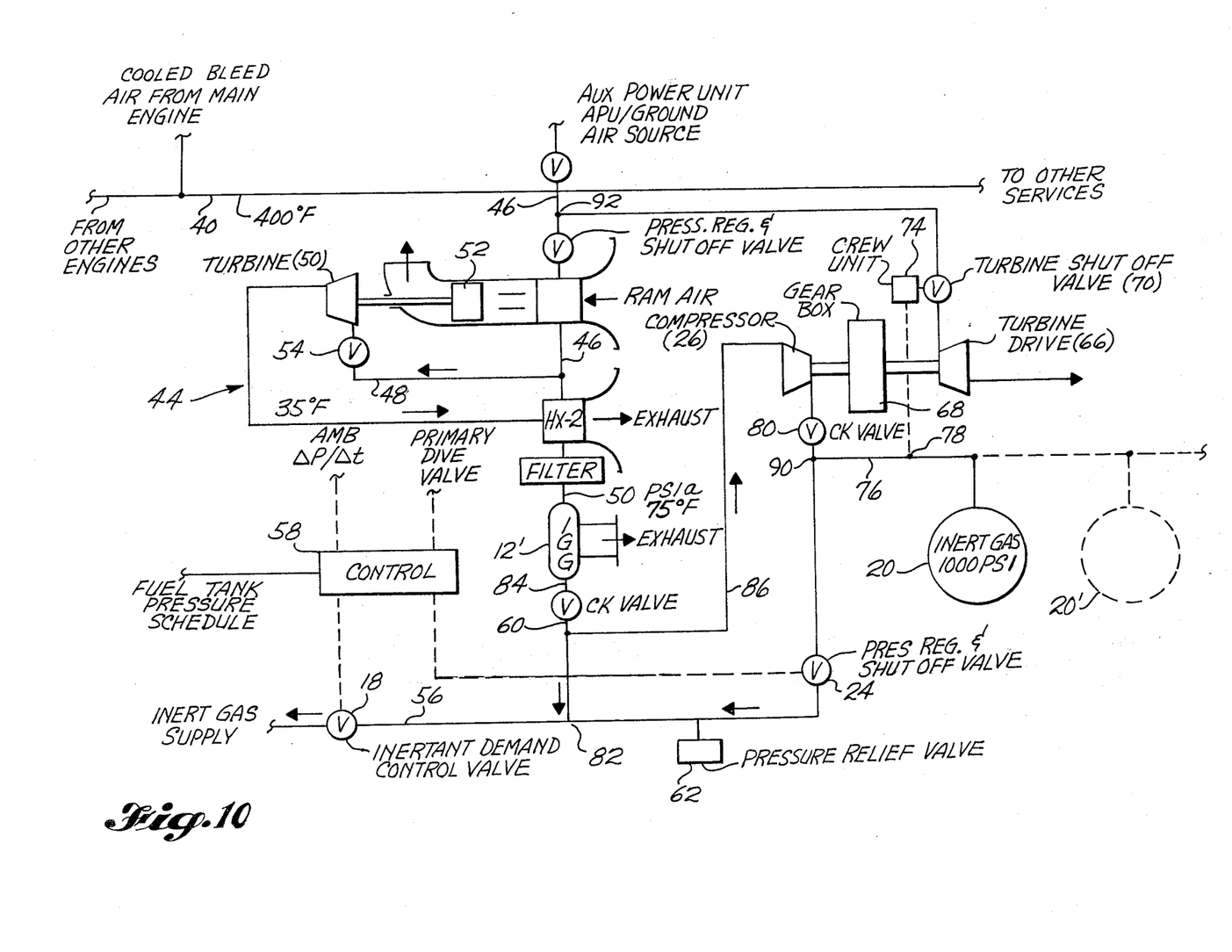
FIG. 10 is a schematic view of a system of the type shown by FIG. 4 adapted for use in a relatively large aircraft.

The system concept shown by FIG. 10 is an onboard inerting system for an aircraft. It utilizes compressed air from the aircraft bleed air manifold 40 which is normally supplied from the aircraft engines in flight. However, the inerting system can be operated from an onboard auxiliary power unit 42 or from a ground cart (via a valued including inlet) during ground operation.

The illustrated inerting system is designed to operate at fifty psia which is compatible with available high-spool bleed pressure of a main engine at idle power, and auxiliary power unit and ground cart pressure levels normally available for engine starting.

The inerting system includes air conditioning equipment 44, capable of cooling bleed air from four hundred degrees F (400° F.) to seventy-five degrees F. (75° F.) required by the inert gas generator 12'. The air conditioning equipment 44 is incorporated into a first conduit 46 which leads from the bleed air manifold 40 to the inlet of the inert gas generator 12'.

By way of typical example, the air conditioning equipment 44 may consist of a first heat exchanger HX-1 in which the bleed air is brought into indirect heat exchange with ram air. A portion of the bleed air exiting from heat exchanger HX-1 is directed via a conduit 48 to a turbine 50. Turbine 50 is connected to a fan 52 located in the ram air path downstream of heat exchanger HX-1. Expansion of the bleed air through the turbine 50 drops the bleed air temperature down to about thirty-five degrees F. (35° F.). The cooled effluent from turbine 50 is then passed in heat exchange with the remaining portion of the bleed air in a second heat exchanger HX-2 which functions to cool the air that is delivered to the inlet of the inert gas generator down to about seventy-five degrees F. (75° F.). The power from turbine 50 is absorbed by the fan 52 which helps move the ram air through the first heat exchanger HX-1.

The power output of turbine 50 is controlled by a valve 54 which in turn is controlled by conventional control means (not shown) which functions in response to changes in the inlet temperature of the air entering the inert gas generator 12'.

Inertant inflow to the fuel tanks is controlled by a demand control valve 18 in conduit 56 which receives its input from an electronic controller 58 which incorporates a programmed pressure schedule and senses ambient rate of pressure change to indicate a descent condition.

The inertant flow to the fuel tanks is normally provided from the inert gas generator for all ground operation, climb and cruise conditions. During descent operation, the electronic controller 58 receives a rate of change of ambient pressure (decreasing altitude) which signals a high pressure regulator valve 24 to open and regulate flow from the storage tank 20 to approximately forty psig. This pressure is higher than the pressure at the outlet of the inert gas generator, resulting in a closure of check valve 60, closing off flow from the inert gas generator so that all flow of inertant to the fuel tanks is from the high pressure reservoir 20. A pressure release valve 62 is provided in the high pressure conduit to protect the inertant system and the fuel tanks from over pressure.

The system shown by FIG. 10 includes a compressor 64 for charging the inert gas storage bottle 20. Compressor 64 is driven by a turbine 66 which receives some of the bleed air from the manifold 40. Turbine 66 drives compressor 64 through a gear box 68. A control valve 70 is provided in the conduit 72 which delivers bleed air from manifold 40 to turbine 66. Valve 70 includes a crew-operated control 74 for opening valve 70 when it is desired to charge the storage bottle 20. Bleed air flowing through turbine 66 drives compressor 64 which moves nitrogen enriched air from the outlet of the inert gas generator into the storage bottle 20. As the bottle 20 fills its pressure and the pressure in conduit 76 rises. When such pressure rises to a sufficient level to indicate that the bottle 20 is full, this pressure is sensed at 78 and the pressure signal operates the valve control 74 to shut off valve 70.

A check valve 80 is located between conduit 76 and compressor 64, to prevent flow from the storage tank 20 during high flow rate operation of the system.

Herein the conduit or system of conduits leading from the bleed air manifold 40 to the inlet of the inert gas generator is sometimes termed the first conduit means. The conduit 56 or system of conduits leading from junction 82 to the fuel tanks is sometimes termed the second conduit means. The conduit or system of conduits 84 leading from the outlet of the inert gas generator to junction 82 is sometimes termed the third conduit means. The conduit 76 or system of conduits leading from the storage vesel 20 to junction 82 is sometimes termed the fourth conduit means. The conduit 86 leading from a juncture 88 with conduit 84 to a juncture 90 with conduit 76 is sometimes referred to as the fifth conduit means. Conduit 72 or the system of conduits leading from bleed air manifold 40 to turbine 66 is sometimes referred to as the sixth conduit means. The bleed air manifold 40, or the system of conduits leading to juncture 92, is sometimes referred to as the seventh conduit means.

Figure 11:
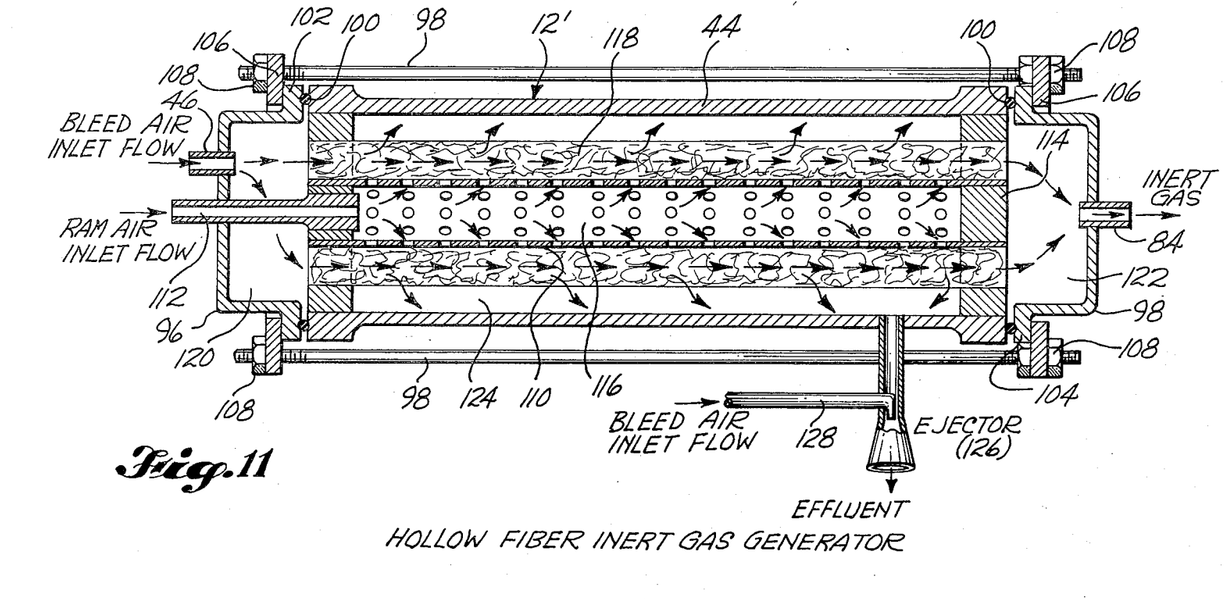
FIG. 11 is a longitudinal sectional view taken through a typical embodiment of a hollow fiber inert gas generator.

Referring now to FIG. 11, a typical embodiment of inert gas generator 12' comprises a cylindrical side wall 94, a pair of cup-like end walls 96, 98, and a plurality of tie rods 98 for drawing the end members 96, 98 into sealed engagement with the ends of the side wall member 94. Suitable seal means, such as O-rings 100, are provided between the end members 96, 98 and the respective ends of the side wall member 94. Each end member 96 includes a flange 102, 104 which makes contact with its O-ring 100. An annular washer 106 slips over the outer portions of the end members 96, 98 and engages the flanges 102, 104, on the sides thereof opposite the O-rings 100. The tie rods exend through openings in the washers 106 and receive nuts 108 at their outer ends which are used for putting the tie rods 96 in tension.

In the illustrated embodiment, a perforated tube 110 is centered within the side wall member 94. A ram air inlet 112 delivers ram air into the interior of tube 110. The opposite of tube 110 is closed by a plug 114, so that the ram air must flow out through side wall openings (some of which are designated 116). The fiber material which removes oxygen from the bleed air occupies an annular zone 118 about the tube 110. The fibers are quite small; they extend longitudinally of the housing 94. In a typical embodiment the fiber structure comprises forty times ten to the sixth power ($40 \times 10^6$) fibers, presenting a frontal area of about 1.32 feet squared. Although quite small in diameter, the fibers are hollow and hence are tubes.

Bleed air at about fifty psia and about seventy-five degrees F. (75° F.) flows from inlet conduit 46 into an inlet chamber 120. Such air encounters the inlet ends of the fibers and can escape from chamber 120 only by flowing longitudinally through the fibers. This result in air separation by oxygen diffusion through the fiber walls. The resulting air is oxygen deficient and nitrogen enriched. The maximum oxygen concentration in the air that is collected in outlet chamber 122 does not exceed nine percent (9%) by volume, rendering the air incapable of supporting combustion. Hence, it can be used for inerting a fuel tank for suppressing a fire.

The ram air is delivered into the tube 112 to help carry the released oxygen away from the fibers. The ram air and waste oxygen are collected in an annular chamber 124 which surrounds the fibers 118. An injector 126 is provided for lowering the pressure in chamber 124. This has the effect of increasing the rate of permeantation of oxygen through the fiber walls and as previously stated, makes it possible to reduce the size and weight of the inert gas generator. Additional bleed air delivered through a conduit 28 is used for driving the ejector 126. The effluent of the ejector 126 is merely dumped.

The ram air which flows outwardly through the opening 116 flows around and over the outer surfaces of the fibers, picking up the freed oxygen and carrying it away from the fibers. Although the use of ram air in this manner is beneficial, it has been found that such use is not absolutely necessary.

This type of inert gas generator is termed a permeable membrane generator. The fibers are polymethyl pentane fibers having an inside diameter of 0.002 inches and a wall thickness of 0.000235 inches. The hollow fiber permeable membrane type inert gas generator was developed by the AiResearch Corporation of California. Another suitable inert gas generator is a molecular sieve design which has been developed by the Bendix Corporation. These inert gas generators are per se known and are per se not a part of our invention.

In summary, in addition to a significant weight advantage, the onboard fuel inerting concept of the present invention has the following additional advantages. It does not require a liquid nitrogen logistic support. It does not require periodic service to replenish liquid nitrogen. It eliminates cryogenic problems. The small size inert gas generator, with associated low bleed air requirement, results in a nominal fuel penalty. Further, when used on aircraft, the inert gas system can be integrated with the aircraft air conditioning and cooling pack. The significant advantages of such integration are: Air processing equipment for the inert gas generator can be eliminated with an associated weight, volume, and cost reduction. Depending on the inerting concept, the air processing equipment may represent fifty percent (50%) of the inerting system weight. Taking air from the air conditioning pack provides pressure in the inert gas generator and a level higher than engine bleed pressure with an associated reduction in inert gas generator weight and volume.

As previously mentioned, the provision of an ejector pump, installed in the inert gas generator exhaust duct, lowers the exhaust pressure with an associated increase in oxygen separation. The ejector pump, powered by compressed air from the pneumatic manifold, functions at sea level and low altitude during fuel scrub operation which requires low oxygen concentration inert gas. The ejector, with an associated bleed air penalty, is not required during aircraft cruise at altitude.

The charging of the high pressure bottle can be accomplished on the ground from an auxiliary power unit or from a pneumatic cart, or can be accomplished from the main engine bleed air source during flight. The system size and weight are sensitive to descent rate because a wide range of discharge rates are possible with the stored high pressure nitrogen enriched air. A quick turn around can be achieved by substitution of prefilled high pressure bottles. Since the high pressure nitrogen enriched air can be used as a fire suppressant, the fire protection systems aboard an aircraft can be simplified.

High pressure nitrogen enriched air can be produced and stored during flight. On board production of nitrogen enriched air is often times practical because during cruise conditions inert gas generating systems have excess capacity that could be used for this purpose.

The concept of this invention is insensitive to aircraft standby times whereby liquid nitrogen has boil-off with resultant time limitations before recharge. For a given amount of gaseous nitrogen stored spherical bottle weight is insensitive to storage pressure. This permits the designer to optimize tank volume-pressure relationship.

High pressure storage of gas is readily accomplished with more than one tank in situations where there are compartment or dry bay limitations. Storage of gaseous nitrogen is amenable to remote location of tanks. Storage with multiple tanks offers redundancy capability and rehit fire suppression capability. By reducing the rate of nitrogen enriched air generation the size and weight of auxiliary equipment such as turbo machinery and heat exchangers can be greatly reduced.

The fuel tank inerting concept is applicable to all types of aircraft including logistic, combat, and commercial although the latter is subject to natural/accident threats only. The system of invention was developed as part of an effort to solve certain aircraft fuel tank inerting problems. However, it is believed that the system has a more general utility and for this reason not all of the claims are limited to a fuel tank inerting use.

What is claimed is:

1. A combustibly inert gas supply system, comprising:
   a first source of combustibly inert gas comprising an inert gas generator, said generator including an inlet for compressed atmospheric air, an outlet, and flow-through means between the inlet and outlet for converting the compressed air into combustibly inert gas;
   first conduit means for delivering compressed air to the inlet;
   second conduit means for delivering inert gas to a utilization site;
   a second source of combustibly inert gas comprising storage means for storing inert gas at a high pressure;
   third conduit means leading from the outlet to the second conduit means;
   fourth conduit means leading from the storage means to the second conduit means;
   fifth conduit means leading from the third conduit means to the fourth conduit means, and including a compressor for charging the high pressure storage means;
   regulator means for switching between said first and second sources and for supplying said second source from said first source.

2. The system of claim 1, said regulator means comprising first valve means in the second and fourth conduit means, for preventing forward flow though said second conduit means and reverse flow through said fourth conduit means, during operation of the compressor to supply said second source, and second valve means in the third and fifth conduit means, for preventing reverse flow through the third conduit means to the generator and reverse flow through the fifth conduit means to the compressor, during periods of discharge from the high pressure storage means.

3. A combustibly inert gas supply system for use aboard an aircraft which includes at least one gas turbine engine having a first compressor, comprising:
   a first source of combustibly inert gas comprising an inert gas generator, said generator including an inlet for compressed air, an outlet for combustibly inert air, and flow-through means between the inlet and outlet for converting the compressed air into combustibly inert gas;
   first conduit means for delivering compressed air to the inlet;

second conduit means for delivering inert gas to a utilization site;

a second source of combustibly inert gas comprising storage means for storing inert gas at a high pressure;

third conduit means leading from the outlet to the second conduit means;

fourth conduit means leading from the storage means to the second conduit means;

fifth conduit means leading from the third conduit means to the fourth conduit means, and including a second compressor for charging the high pressure storage means;

turbine means drivingly connected to the second compressor;

sixth conduit means for delivering compressed atmospheric air to the turbine means for powering same;

seventh conduit means for delivering compressed air from the first compressor to both the first conduit means and the sixth conduit means;

regulator means for switching between said first and second sources in dependence upon the inert gas flow demand of the utilization site, and for supplying said second source from said first source.

4. The inert gas supply system of claims 1 or 3 wherein said utilization site is a fuel tank.

5. The inert gas supply system of claims 1 or 3 further comprising at least one branch conduit means leading from said storage means to at least one further utilization site.

6. The system of claims 1 or 3, wherein the inert gas generator is a hollow fiber generator.

7. The system of claims 1 or 7, wherein the inert gas generator is a molecular sieve generator.

8. A method of supplying combustibly inert gas at both low and high flow rates with a substantial saving in equipment weight, comprising the steps of:

providing a noncombusting, inert gas generator sized to meet low system flow rate demand;

using said inert gas generator to produce a nitrogen enriched, combustibly inert gas by withdrawing oxygen from flowing, compressed, atmospheric air;

delivering the inert gas, as it is produced by the generator, directly to the utilization site during system flow rate demand periods that are less than or equal to said low system flow rate;

providing at least one high pressure inert gas storage container;

compressing some of the inert gas from the generator and storing it in the storage container at a high pressure; and selectively delivering inert gas to the utilization site from the container during system flow rate demand periods that are higher than said low system flow rate.

9. The method of claim 8, wherein said utilization site is a fuel tank.

10. The method of claim 8, wherein the inert gas generator is a hollow fiber generator.

11. The method of claim 8, wherein the inert gas generator is a molecular sieve generator.

12. The method of claim 9, further comprising sensing said higher flow rate demand at the fuel tank and in response to such demand delivering inert gas from the container to the fuel tank at the required flow rate.

* * * * *